(12) United States Patent
Solvang et al.

(10) Patent No.: US 8,822,359 B2
(45) Date of Patent: Sep. 2, 2014

(54) MINERAL FIBRES AND THEIR USE

(75) Inventors: Mette Solvang, Roskilde (DK); Eva Ravn Nielsen, Ballerup (DK); Dorthe Lybye, Roskilde (DK)

(73) Assignee: Rockwool International A/S, Hedehusene (DK)

( * ) Notice: Subject to any disclaimer, the term of this patent is extended or adjusted under 35 U.S.C. 154(b) by 323 days.

(21) Appl. No.: 13/384,044

(22) PCT Filed: Jul. 13, 2010

(86) PCT No.: PCT/EP2010/059993
§ 371 (c)(1),
(2), (4) Date: Mar. 26, 2012

(87) PCT Pub. No.: WO2011/006875
PCT Pub. Date: Jan. 20, 2011

(65) Prior Publication Data
US 2012/0183758 A1    Jul. 19, 2012

(30) Foreign Application Priority Data
Jul. 13, 2009   (EP) ..................................... 09009130

(51) Int. Cl.
C03C 13/06    (2006.01)
C03C 13/00    (2006.01)
C03C 3/097    (2006.01)

(52) U.S. Cl.
CPC ................. *C03C 13/06* (2013.01); *C03C 13/00* (2013.01); *C03C 3/097* (2013.01)
USPC .............................................. 501/36; 501/35

(58) Field of Classification Search
CPC ................................ C03C 13/00; C03C 13/06
USPC ....................................................... 501/35, 36
See application file for complete search history.

(56) References Cited

U.S. PATENT DOCUMENTS

| | | | | |
|---|---|---|---|---|
| 4,079,022 | A * | 3/1978 | Ferrarini et al. | 521/103 |
| 5,614,452 | A * | 3/1997 | Clausen et al. | 501/155 |
| 5,932,500 | A * | 8/1999 | Jensen et al. | 501/36 |
| 5,935,886 | A * | 8/1999 | Jensen et al. | 501/36 |
| 6,156,683 | A * | 12/2000 | Grove-Rasmussen et al. | 501/35 |
| 6,698,245 | B1 * | 3/2004 | Christensen et al. | 65/376 |
| 6,998,361 | B2 * | 2/2006 | Lewis | 501/36 |
| 2003/0166446 | A1 * | 9/2003 | Lewis | 501/27 |
| 2006/0042319 | A1 * | 3/2006 | Nykiel et al. | 65/134.8 |
| 2007/0166538 | A1 * | 7/2007 | Jensen | 428/375 |

FOREIGN PATENT DOCUMENTS

| | | |
|---|---|---|
| EP | 1 157 974 A1 | 11/2001 |
| WO | WO-97/20780 A1 | 6/1997 |
| WO | WO-2005/035895 A1 | 4/2005 |

* cited by examiner

*Primary Examiner* — Karl Group
*Assistant Examiner* — Elizabeth A Bolden
(74) *Attorney, Agent, or Firm* — Tarolli, Sundheim, Covell & Tummino LLP

(57) ABSTRACT

The invention relates to mineral fibers formed of a composition comprising the following oxides, by weight of composition: —$SiO_2$ 35 to 43.5% —$Al_2O_3$ 18 to 22% —$Fe_2O_3$ 9 to 16% —CaO 8 to 17% —MgO 7 to 15% —$Na_2O+K_2O$ 1 to 5% —MnO up to 2%.

19 Claims, No Drawings

MINERAL FIBRES AND THEIR USE

FIELD OF THE INVENTION

The invention relates to mineral fibres bonded products formed from mineral fibres and their use, in particular in specialised fire protection applications.

BACKGROUND OF THE INVENTION

It is well known to use mineral fibres, generally in consolidated form with binder, as fire protection products. Fire protection products are used in a wide variety of situations. In certain particular cases the risk is of a fire which would lead to an extremely fast rise in temperature. Such situations include off-shore applications such as on oil rigs where there is a risk of hydrocarbon fire and marine applications in ships due to the fact that they carry their own fuel, and so on. Other circumstances in which there is a risk of extremely rapid temperature rise include chemical plants where there is a risk of explosive fire and in tunnels. Further circumstances in which there is a risk of extremely rapid temperature rise and/or very little presence of oxygen includes fire doors, sandwich panels and roof boards.

WO 2005/035895 gives an example of a mineral fibre insulation product particularly for use in ship building. The content of oxides in the mineral fibre composition is: $SiO_2$ 25 to 55%, $Al_2O_3$ 16 to 27%, CaO 6 to 20%, MgO 1 to 5%, FeO 15 to 15%, and alkali metal oxides $R_2O$ 10 to 14 7%.

Various types of stone wool are well known for use in fire protection applications but for applications such as those where very high and rapid temperature rise is expected (for instance where the temperature increase surpasses what is described in the standard fire curve and test method described in ISO 834-1 test procedure IMO Res 754 (18): Recommendation on fire resistance tests for "A", "B" and "F" class divisions), currently available stone wool usually can meet the stringent requirements for use in these circumstances only if it is used at a very high density and/or high thickness. This can be disadvantageous as it adds to expense and to the weight of the product and its bulk. Ceramic products can also meet the stringent requirements of these circumstances but tend to be expensive to produce.

For instance, EP-A-1157974 is one example of many stone wool compositions for general insulation purposes. It does not discuss the specific requirements of products useful for fire protection in the unusual cases where it is necessary to protect against very high and rapid temperature rises.

Accordingly, it would be desirable to be able to provide a mineral fibre product capable of effectively providing fire protection in these stringent circumstances at lower densities and/or thicknesses. It would also be desirable to provide such a product which is technically and economically feasible to produce.

SUMMARY OF THE INVENTION

According to the invention we provide mineral fibres formed of a composition comprising the following oxides, by weight. Oxide contents are quoted by weight of composition.

| | |
|---|---|
| $SiO_2$ | 35 to 43.5% |
| $Al_2O_3$ | 18 to 22% |
| $Fe_2O_3$ | 9 to 16% |
| CaO | 8 to 17% |
| MgO | 7 to 15% |
| $Na_2O + K_2O$ | 1 to 5% |
| MnO | up to 2% |

The fibres of the invention are thus stone wool fibres.

DESCRIPTION OF THE PREFERRED EMBODIMENT

In this specification total iron oxide is calculated and quoted as $Fe_2O_3$. However, the iron will to a large extent be present as $Fe^{2+}$. Normally more than 50 atom % will be present as $Fe^{2+}$, often more than 80 atom % and preferably more than 96 atom %.

Surprisingly, we find that by choosing this specific range of compositional characteristics, a mineral fibre product formed of bonded fibres having this composition can pass the very stringent hydrocarbon fire test. The hydrocarbon curve is specified in EN 1363-2 test procedure IMO Res 754 (18): Recommendation on fire resistance tests for "A", "B" and "F" class divisions. The product made from the fibres of the invention is effective in circumstances where there is a risk of fire which is explosive or otherwise generates an extremely fast temperature rise.

We also find that the composition is such that it has good melt properties. In order to make the product is it is necessary to produce a melt having the same composition as the fibres. The viscosity, melt fragility and crystallizing properties of such a melt are such that it is not difficult to handle and therefore the fibres can be produced in a convenient and economical manner.

Furthermore, it is important that mineral fibres can be said to be biologically soluble and we find that this composition also retains this property of commercial stone wool materials.

The mineral fibres of the invention are especially valuable in the field of fire protection.

In these applications the mineral fibres may be used in the form of bonded tufts of fibres, but generally they are formed into a coherent mineral fibre product formed of consolidated fibres and comprising binder. Generally, the product is in the form of a slab/batt or roll, pipe sections, wired mat or needled products. Batts are normally planar but can be pre-formed in a curved or other non-planar shape in order to fit around or against an element which is to be insulated or protected. The product can be relatively rigid or can be made in flexible form so that it can in use adapt to any configuration.

Generally, the content of binder is in the range 0.2 to 6.0%, especially 0.4 to 3.0% (by weight based on weight of product).

Binder may be selected from any of the types known for bonding mineral fibre products, such as inorganic or organic binders, especially phenol urea formaldehyde binders, furan based binders, polyesters, polyacrylics, polyester-amides, epoxides, polyurethanes, or combinations of same inorganic binders such as silicates, phosphor silicates, alkali silicates (such as water glass), geopolymers, colloidal silica or colloidal alumina can also be used, but organic binders are preferred.

The mineral fibre product may have the conventional range of densities for fire protection properties. It is one of the advantages of the composition of the fibres of the invention that the bonded product may have conventional density and yet show surprisingly improved fire protection properties. Thus the density is preferably not more than 300 kg/m³, in particular not more than 250 kg/m³ or especially not more than 200 kg/m³, in particular not more than 170 kg/m³. It is usually at least 50 kg/m³ and in particular at least 80 kg/m³, preferably at least 100 kg/m³, more preferably at least 140 kg/m³.

The thickness of the product is preferably not more than 300 mm, in particular not more than 100 mm. Preferably it is at least 10 mm, in particular at least 20 mm.

According to the invention the content of $SiO_2$ in the fibre composition is in the range 35 to 43.5 wt % based on the composition. Preferably it is not more than 42 wt %, more preferably in the range 37 to 40 wt %.

The level of $Al_2O_3$ is in the range 18 to 22 wt %. Preferably it is in the range 18 to 21 wt %.

The total amount of $SiO_2+Al_2O_3$ is preferably at least 55 wt % and generally not more than 62 wt % and preferably not more than 60 wt %.

The fibres will often have a content of $TiO_2$ and this is usually not more than 4 wt %, preferably in the range 0.5 to 2 wt %.

According to the invention the claimed fibres have at the same time an unusually high content of both iron (calculated as $Fe_2O_3$) and MgO. The level of $Fe_2O_3$ is in the range 9 to 16 wt %. Preferably it is at least 10 wt %, more preferably at least 11 wt %. The amount of $Fe_2O_3$ is generally not more than 15 wt %.

The level of CaO is at least 8 wt %, preferably at least 9 wt %. It can be advantageous for it not to be more than 16 wt %. This upper limit assists in achieving practical melt properties even with a melt which has very high content of $Fe_2O_3$ and MgO.

The level of MgO is at least 7 wt % and in particular we obtain very good results when it is at least 9 wt %, preferably at least 10 wt % and in particular at least 11 wt %. It is not more than 15 wt %.

Preferably the content of $Fe_2O_3$ plus MgO is at least 17 wt %.

In the invention particularly good fire protection properties are achieved when the level of $Fe_2O_3$ is at least 10 wt % at the same time as the level of MgO is at least 10 wt %. In particular the level of $Fe_2O_3$ is at least 12.5 wt % at the same time as the level of MgO is at least 11 wt %.

The mineral fibre composition has a content of alkali metal $R_2O$, namely $Na_2O+K_2O$, in the range 1 to 5 wt %. Preferably the level of $Na_2O$ is in the range 1 to 4 wt % and the level of $K_2O$ is in the range 0.5 to 2 wt %.

The fibre composition can include other oxides. These include $P_2O_5$ and preferred levels of this oxide are up to 4 wt %.

MnO is included and is present in amounts of not more than 4 wt %, in particular not more than 2 wt %, especially not more than 1 wt %. Levels of MnO are preferably at least 0.2 wt %.

The inclusion of MnO contributes to the ability of the product to give excellent protection against rapid temperature rises such as in hydrocarbon fires.

In the invention the mineral fibres are produced by providing a mineral charge, melting the charge to produce a mineral melt and fiberising the melt. The melt will have essentially the same composition as the final fibres, as is usual.

Fiberisation can be carried out by known means, for instance by means of a centrifugal fiberisation process. Preferably the fibres are made using a cascade spinning process. In this method one or usually at least two, in particular at least three and especially at least four rotors are each arranged for rotation about a horizontal axis. Mineral melt is poured on to the first rotating rotor and some is flung from the rotor as fibres and some is flung onto the next rotating rotor, from which more is flung as fibres and so on to the next rotating rotor, and so on.

The fibres are then collected as a web and formed into the desired final product in the usual manner.

The products may also be formed so as to contain fire retardant additives usually in particulate form. Suitable preferred fire retardant additives are described in our international publication WO-A-97/20780. Preferred materials include carbonates and hydrates which decompose endothermically at a temperature above 200° C. Such materials liberate carbon dioxide and/or water of crystallisation at temperatures above 200° C. Suitable materials are magnesium hydroxide, calcite (calcium carbonate), dolomite, siderite, aragonite magnesite, brucite, magnesium carbonate, barium carbonate, barium hydroxide, ferric hydroxide, ferrous hydroxide, pyrite and silicon compounds with water of crystallization. Magnesium hydroxide is preferred.

Fire retardant additive can be included in the product in amounts preferably in the range 25 to 200 kg/m³.

Other additives that can be incorporated include graphite.

An advantage of the composition of the fibres of the invention is that, at the same time as having excellent fire protection properties, the composition is such that the melt has properties which mean it can conveniently be processed in standard manner, such as by the cascade spinner methods discussed above.

For instance, the composition is formulated so that the melt viscosity is within convenient ranges Generally it is from 8 to 70 poise at 1400° C. especially 10 to 70 poise, in particular 10 to 25 poise. Viscosity is measured according to ASTM C 965-96. These viscosity ranges mean that normal processing methods can be used to provide the fibres of the invention.

The compositions are also formulated so that they have glass transition temperature $T_g$ in convenient ranges for standard production. The melt compositions which are formed to generate fibres of the invention also have acceptable fragility properties. That is, they do not have excessive tendency to crystallise during cooling.

A further advantage of the fibres according to the invention is that they retain good biosolubility properties but are not liable to dissolve in use under humid conditions.

The fibres of the invention are particularly useful for insulation and fire protection in circumstances where there is a risk of rapidly developing fire, in particular explosive fire. That is, these are circumstances where the temperature increase surpasses what is described in ISO 834-1 test procedure: IMO Res 754 (18): Recommendation on fire resistance tests for "A", "B" and "F" class divisions (the normal fire curve).

Thus, applications in which products made of fibres of the invention can be used include insulation and/or fire protection in: gas and chemical transport; floating oil rigs; regular oil and gas rigs; petrochemical plants and other industrial plants where there is a risk of a fast fire development, and in tunnels. The applications include insulation where jet fires can arise, jet fires being a turbulent diffusion flame resulting from the combustion of a fuel continuously released with some significant momentum (jet fires can arise from release of gaseous flashing liquid and pure liquid inventories); fire protection and insulation in chemical waste processing plants; tunnel insulation. It is also possible to use fibres of the invention as fire protection in industries within the Seveso directive. The mineral fibres of the invention can also be used as insulation in marine applications. Specific applications include H-0400 deck and bulk head, H-60 deck and bulk head, restricted (fire to the wool-side) and non-restricted, H-120 deck and bulk head, restricted and non-restricted, HC blast test (explosion) and HC jet fire test.

An advantage of the fibres of the invention is that products made using these fibres and having standard density and thickness can pass the hydrocarbon fire test (HC). The hydrocarbon fire curve is specified in EN 1363-2 test procedure IMO Res 754 (18): Recommendation on fire resistance tests for "A", "B" and "F" class divisions.

EXAMPLES

Example 1

A fibre product according to the invention has the following composition, by weight of oxides, $SiO_2$ 39.1%, $Al_2O_3$ 19.8%, $TiO_2$ 1.8%, $Fe_2O_3$ 13.9%, CaO 10.3%, MgO 11.7%, $Na_2O$ 1.8%, $K_2O$ 0.9%, $P_2O_5$ 0.4%, MnO 0.2%.

Example 2

A further fibre product according to the invention has the following composition, by weight of oxides: $SiO_2$ 38.8%, $Al_2O_3$ 19.7%, $TiO_2$ 1.7%, $Fe_2O_3$ 10.3%, CaO 16.1%, MgO 10.0%, $Na_2O$ 1.7%, $K_2O$ 0.8%, $P_2O_5$ 0.4%, MnO 0.4%, Example 3

In an example a product formed of fibres having the composition in Example 1 bonded with binder, having density 140 kg$^3$ and ignition loss 1.4% is subjected to the non-restricted bulkhead hydrocarbon fire test. Two products each of thickness 65 mm were used. The test was stopped after 150 minutes because the temperature increase never reached the maximum of 140° C. The maximum was around 105° C., at around 70 minutes.

In comparison, a standard stone wool product allowed a temperature increase of 140° C. after about 50 minutes.

Example 4

In a further test using the restricted hydrocarbon test, the same products as in Example 3 showed a maximum temperature increase of less than 120° C. after 140 minutes. This is in contrast with a standard stone wool product which showed temperature rise of 140° C. after around 70 minutes.

The invention claimed is:
1. Mineral fibres formed of a composition comprising the following oxides, by weight of composition:

| | |
|---|---|
| $SiO_2$ | 35 to 43.5% |
| $Al_2O_3$ | 18 to 22% |
| $Fe_2O_3$ | at least 12.5 to 16% |
| CaO | 8 to 17% |
| MgO | at least 11 to 15% |
| $Na_2O + K_2O$ | 1 to 5%: and |
| MnO | up to 2%. |

2. Mineral fibres according to claim 1 in which the content of CaO is not more than 16%.

3. Mineral fibres according to claim 1 in which the composition further comprises $TiO_2$ in an amount of up to 4%.

4. Mineral fibres according to claim 1 in which the composition further comprises $P_2O_5$ in an amount of up to 4%.

5. Mineral fibres according to claim 1 in which the content of MnO is at least 0 2%.

6. Mineral fibres according to claim 1 in which the content of $Na_2O$ is in the range 1 to 4%.

7. Mineral fibres according to claim 1 in which the content of $K_2O$ is in the range 0.5 to 2%.

8. Mineral fibres according to claim 1 in which the content of $SiO_2$ is not more than 42%.

9. Mineral fibres according to claim 8 in which the content of $SiO_2$ is not more than 40%.

10. Mineral fibres according to claim 1 in which the content of $SiO_2+Al_2O_3$ is not more than 60%.

11. A product formed of mineral fibres according to claim 1 in coherent form.

12. A method of using a bonded product formed of the mineral fibres of claim 11 for fire protection, comprising fitting the bonded product around or against an element which is to be insulated or protected.

13. The method according to claim 12 in an application where there is a risk of explosive fire.

14. The method according to claim 13 in which the density of the mineral fibre product is not more than 200 kg/m$^3$.

15. The method according to claim 12 in an off-shore application or a marine application or as tunnel insulation or in a chemical plant.

16. The method according to claim 12 in which the thickness of the mineral fibre product is not more than 300 mm.

17. A bonded product formed of mineral fibres according to claim 1 in consolidated form with binder.

18. A method of making mineral fibres according to claim 1 comprising providing a mineral charge, melting the charge to produce a mineral melt and fiberising the melt.

19. A method according to claim 18 in which fiberisation is carried out using a cascade spinning method.

* * * * *